US012762351B2

(12) United States Patent
Gildert

(10) Patent No.: US 12,762,351 B2
(45) Date of Patent: Oct. 13, 2026

(54) SYSTEMS, DEVICES, AND METHODS FOR OPERATING A ROBOTIC SYSTEM

(71) Applicant: Sanctuary Cognitive Systems Corporation, Vancouver (CA)

(72) Inventor: Suzanne Gildert, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 362 days.

(21) Appl. No.: 18/425,557

(22) Filed: Jan. 29, 2024

(65) Prior Publication Data

US 2024/0253221 A1 Aug. 1, 2024

Related U.S. Application Data

(60) Provisional application No. 63/531,634, filed on Aug. 9, 2023, provisional application No. 63/441,897, filed on Jan. 30, 2023.

(51) Int. Cl.

*G06F 40/40* (2020.01)
*B25J 9/16* (2006.01)

(Continued)

(52) U.S. Cl.

CPC ............ *G06F 40/40* (2020.01); *B25J 9/1602* (2013.01); *B25J 9/163* (2013.01); *B25J 9/1653* (2013.01);

(Continued)

(58) Field of Classification Search

None

See application file for complete search history.

(56) References Cited

U.S. PATENT DOCUMENTS 6,314,555 B1 11/2001 Ndumu
7,630,986 B1 12/2009 Herz (Continued)

FOREIGN PATENT DOCUMENTS

EP 3734596 A1 11/2020
WO 2007041295 A2 12/2007

(Continued)

OTHER PUBLICATIONS

Benjamin et al., "A Cognitive Robotics Approach to Comprehending Human Language Behaviors", 2007, ACM, pp. 185-192.

(Continued)

*Primary Examiner* — Quynh H Nguyen
(74) *Attorney, Agent, or Firm* — Thomas Mahon

(57) ABSTRACT

A robotic system includes a robot, an object recognition subsystem, an interface to a large language model (LLM), and a system controller. The robot operates in an environment that includes a first and a second object. In an example method of operation of the robotic system, the object recognition subsystem assigns a first label to the first object. The interface sends a query, including the first label, to the LLM. The interface receives a response from the LLM, the response in reply to the query and including a second label. The object recognition subsystem assigns the second label to the second object. In some implementations, the object recognition subsystem includes sensors and a sensor data processor. The sensors scan the environment to generate sensor data, and the sensor data processor detects the presence of the first and the second object based at least in part on the sensor data.

13 Claims, 12 Drawing Sheets

(51) Int. Cl.

| | |
|---|---|
| ***B25J 11/00*** | (2006.01) |
| ***B25J 13/00*** | (2006.01) |
| ***G06F 40/205*** | (2020.01) |

(52) U.S. Cl.

CPC ........... *B25J 9/1658* (2013.01); *B25J 9/1661* (2013.01); *B25J 9/1664* (2013.01); *B25J 9/1671* (2013.01); *B25J 9/1679* (2013.01); *B25J 9/1697* (2013.01); *B25J 11/0005* (2013.01); *B25J 13/003* (2013.01); *G06F 40/205* (2020.01)

(56) References Cited

U.S. PATENT DOCUMENTS

| | | | | |
|---|---|---|---|---|
| 11,351,680 | B1 | 6/2022 | Rosenberg | |
| 11,931,894 | B1 | 3/2024 | Rose | |
| 2017/0348854 | A1 | 12/2017 | Oleynik | |
| 2019/0005948 | A1 | 1/2019 | Gao | |
| 2019/0065888 | A1* | 2/2019 | Calenzo | G06F 18/22 |
| 2019/0378019 | A1 | 12/2019 | Scheutz | |
| 2020/0171671 | A1 | 6/2020 | Huang | |
| 2020/0365148 | A1* | 11/2020 | Ji | G10L 15/30 |
| 2021/0232121 | A1 | 7/2021 | Pramanick | |
| 2021/0291363 | A1 | 9/2021 | Sarkar | |
| 2022/0014476 | A1* | 1/2022 | Brantner | H04L 67/562 |
| 2022/0165007 | A1 | 5/2022 | Friedman | |
| 2022/0258340 | A1 | 8/2022 | Gildert | |
| 2022/0274251 | A1 | 9/2022 | Leon | |
| 2023/0031545 | A1 | 2/2023 | Oleynik | |
| 2023/0311335 | A1 | 10/2023 | Hausman | |
| 2023/0398696 | A1 | 12/2023 | Kollar | |

FOREIGN PATENT DOCUMENTS

| | | | |
|---|---|---|---|
| WO | 2019021058 | A1 | 1/2019 |
| WO | 2021231895 | A1 | 11/2021 |
| WO | 2022187395 | A2 | 9/2022 |

OTHER PUBLICATIONS

PCT International Search Report, PCT/CA2024/050107, Apr. 24, 2024.

PCT International Search Report, PCT/CA2024/050109, May 6, 2024.

PCT International Search Report, PCT/CA2024/050110, May 1, 2024.

USPTO Notice of References Cited, U.S. Appl. No. 18/417,081, Mar. 27, 2024.

* cited by examiner

SYSTEMS, DEVICES, AND METHODS FOR OPERATING A ROBOTIC SYSTEM

TECHNICAL FIELD

The present systems, devices, and methods generally relate to the operation of a robotic system in an environment, and, in particular, the identification of objects in the environment by the robotic system.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Various sensors, combined with advanced data processing, can enable robots to "see" and interpret their environment. Object recognition, tracking, and scene understanding techniques can be used to identify and understand objects, people, and their spatial relationships. Sensors can include high-resolution cameras, Light Detection and Ranging (LiDAR), radar, ultrasonics, Inertial Measurement Units (IMUs), tactile sensors (e.g., pressure-sensitive materials and arrays of touch sensors), and environmental sensors (e.g., temperature sensors, humidity sensors, gas sensors, and biosensors).

Data processing can include sensor fusion, which can be achieved by combining data from multiple sensors. Sensor fusion can help robots integrate and interpret information from different sensors to make informed decisions and navigate complex environments.

Machine learning and artificial intelligence techniques can be applied to robot sensing, for example, to help robots recognize patterns, classify objects, and learn from sensor data, thereby enhancing their ability to adapt, recognize new objects, and perform complex tasks based on real-time feedback.

A large language model (LLM) is an artificial intelligence (AI) system that has been trained on massive amounts of text data. Typically, an LLM can understand and generate human-like text, making it capable of various natural language-related tasks such as understanding context, answering questions, generating responses, and writing coherent paragraphs.

An LLM can be trained using deep-learning techniques on vast datasets that include diverse sources such as books, articles, websites, and other written content. During training, the LLM can learn patterns, grammar, and semantic relationships from the text data, allowing it to generate coherent and contextually relevant responses.

An LLM can be used in a wide range of applications, for example, natural language understanding, content generation, language translation, language learning, text summarization, creative writing, virtual simulation, and gaming.

LLM technology has immense potential to transform how humans and other systems interact with AI systems, provide language-related services, and enhance various aspects of human-machine interaction.

BRIEF SUMMARY

A method of operation of a robotic system, the robotic system comprising a robot, an object recognition subsystem, and an interface to a large language model (LLM), the robot operating in an environment, the environment comprising a plurality of objects, the plurality of objects including a first object and a second object, may be summarized as comprising assigning, by the object recognition subsystem, a first label to the first object, sending, by the interface, a query to the LLM, the query comprising the first label, receiving, by the interface, a response from the LLM, the response in reply to the query, the response comprising a second label, and assigning, by the object recognition subsystem, the second label to the second object.

In some implementations, the object recognition subsystem comprises a plurality of sensors and a sensor data processor, and the method further comprises scanning the environment, by the plurality of sensors, to generate sensor data, and detecting, by the sensor data processor, the presence of the first object and the second object, wherein the detecting, by the sensor data processor, the presence of the first object and the second object is based at least in part on the sensor data.

In some implementations, the assigning, by the object recognition subsystem, a first label to the first object includes identifying the first object based at least in part on the sensor data, and assigning a natural language label to the first object. The sending, by the interface, a query to the LLM may include formulating a natural language statement, the natural language statement comprising the natural language label assigned to the first object. The method may further comprise determining a degree of confidence in the identifying of the first object exceeds a determined confidence threshold, wherein the determining a degree of confidence in the identifying of the first object exceeds a determined confidence threshold includes determining a probability.

In some implementations, the scanning the environment, by the plurality of sensors, to generate sensor data includes generating at least one of image data, video data, audio data, or haptic data.

In some implementations, the detecting, by the sensor data processor, the presence of the first object and the second object includes detecting, by the sensor data processor, the presence of the first object and the second object in real time.

In some implementations, the detecting, by the sensor data processor, the presence of the first object and the second object is performed onboard the robot.

In some implementations, the method further comprises assigning, by the object recognition subsystem, a third label to the second object, wherein the assigning, by the object recognition subsystem, a third label to the second object includes identifying the second object based at least in part on the sensor data, and determining a degree of confidence in the identifying of the second object fails to exceed a determined confidence threshold. The assigning, by the object recognition subsystem, the second label to the second object may include updating the degree of confidence in the identifying of the second object. The updating the degree of confidence in the identifying of the second object may include updating a probability.

In some implementations, the assigning, by the object recognition subsystem, a first label to the first object is performed onboard the robot.

In some implementations, the sending, by the interface, a query to the LLM includes formulating a natural language statement, the natural language statement comprising the first label. The formulating a natural language statement may include structuring the natural language statement to cause the response from the LLM to follow a defined structure.

In some implementations, the receiving, by the interface, a response from the LLM includes receiving a natural language statement, the natural language statement comprising a natural language label, and parsing the natural language statement to extract the natural language label. The assigning, by the object recognition subsystem, a second label to the second object may include assigning the natural language label to the second object.

In some implementations, the assigning, by the object recognition subsystem, a first label to the first object includes identifying the first object, and assigning a natural language label to the first object. The method may further comprise determining a degree of confidence in the identifying of the first object exceeds a determined confidence threshold, wherein the determining a degree of confidence in the identifying of the first object exceeds a determined confidence threshold includes determining a probability. The sending, by the interface, a query to the LLM may include formulating a natural language statement, the natural language statement comprising the natural language label. The formulating a natural language statement may include structuring the natural language statement to cause the response from the LLM to follow a defined structure.

In some implementations, the receiving, by the interface, a response from the LLM includes receiving a natural language statement, the natural language statement comprising a natural language label, and parsing the natural language statement to extract the natural language label.

In some implementations, the method further comprises assigning, by the object recognition subsystem, a third label to the second object, wherein the assigning, by the object recognition subsystem, a second label to the second object includes comparing the second label with the third label. The assigning, by the object recognition subsystem, a second label to the second object further may include updating a degree of confidence. The updating a degree of confidence may include updating a probability.

In some implementations, the method further comprises determining, by the object recognition system, a location of the first object in the environment.

A computer program product for performing a method of operation of a robotic system, the robotic system comprising one or more non-volatile processor-readable storage media, one or more processors, a robot, an object recognition subsystem, and an interface to a large language model (LLM), the robot operating in an environment, the environment comprising a plurality of objects, the plurality of objects including a first object and a second object, may be summarized as comprising data and processor-executable instructions stored in the one or more non-volatile processor-readable storage media that, when executed by the one or more processors communicatively coupled to the storage media, cause the one or more processors to perform the method of operation of the robotic system, the method comprising assigning, by the object recognition subsystem, a first label to the first object, sending, by the interface, a query to the LLM, the query comprising the first label, receiving, by the interface, a response from the LLM, the response in reply to the query, the response comprising a second label, and assigning, by the object recognition subsystem, the second label to the second object.

In some implementations, the object recognition subsystem comprises a plurality of sensors and a sensor data processor, and the method further comprises scanning the environment, by the plurality of sensors, to generate sensor data, and detecting, by the sensor data processor, the presence of the first object and the second object, wherein the detecting, by the sensor data processor, the presence of the first object and the second object is based at least in part on the sensor data. The assigning, by the object recognition subsystem, a first label to the first object may include identifying the first object based at least in part on the sensor data, and assigning a natural language label to the first object. The sending, by the interface, a query to the LLM may include formulating a natural language statement, the natural language statement comprising the natural language label assigned to the first object. The method may further comprise determining a degree of confidence in the identifying of the first object exceeds a determined confidence threshold, wherein the determining a degree of confidence in the identifying of the first object exceeds a determined confidence threshold includes determining a probability.

In some implementations, the scanning the environment, by the plurality of sensors, to generate sensor data includes generating at least one of image data, video data, audio data, or haptic data.

In some implementations, the detecting, by the sensor data processor, the presence of the first object and the second object includes detecting, by the sensor data processor, the presence of the first object and the second object in real time.

In some implementations, the detecting, by the sensor data processor, the presence of the first object and the second object is performed onboard the robot.

In some implementations, the method may further comprise assigning, by the object recognition subsystem, a third label to the second object, wherein the assigning, by the object recognition subsystem, a third label to the second object includes identifying the second object based at least in part on the sensor data, and determining a degree of confidence in the identifying of the second object fails to exceed a determined confidence threshold. The assigning, by the object recognition subsystem, the second label to the second object may include updating the degree of confidence in the identifying of the second object. The updating the degree of confidence in the identifying of the second object may include updating a probability.

In some implementations, the assigning, by the object recognition subsystem, a first label to the first object is performed onboard the robot.

In some implementations, the sending, by the interface, a query to the LLM includes formulating a natural language statement, the natural language statement comprising the first label. The formulating a natural language statement may include structuring the natural language statement to cause the response from the LLM to follow a defined structure.

In some implementations, the receiving, by the interface, a response from the LLM includes receiving a natural language statement, the natural language statement comprising a natural language label, and parsing the natural language statement to extract the natural language label. The assigning, by the object recognition subsystem, a second label to the second object may include assigning the natural language label to the second object.

In some implementations, the assigning, by the object recognition subsystem, a first label to the first object includes identifying the first object, and assigning a natural language label to the first object. The method may further comprise determining a degree of confidence in the identifying of the first object exceeds a determined confidence threshold, wherein the determining a degree of confidence in the identifying of the first object exceeds a determined confidence threshold includes determining a probability. The sending, by the interface, a query to the LLM may include formulating a natural language statement, the natural language statement comprising the natural language label. The formulating a natural language statement may include structuring the natural language statement to cause the response from the LLM to follow a defined structure.

In some implementations, the receiving, by the interface, a response from the LLM includes receiving a natural language statement, the natural language statement comprising a natural language label, and parsing the natural language statement to extract the natural language label.

In some implementations, the method further comprises assigning, by the object recognition subsystem, a third label to the second object, wherein the assigning, by the object recognition subsystem, a second label to the second object includes comparing the second label with the third label. The assigning, by the object recognition subsystem, a second label to the second object further may include updating a degree of confidence. The updating a degree of confidence may include updating a probability.

In some implementations, the method further comprises determining, by the object recognition system, a location of the first object in the environment.

A robotic system may be summarized as comprising a robot operable in an environment, the environment comprising a plurality of objects, the plurality of objects including a first object and a second object, an object recognition subsystem communicatively coupled to the robot; and an interface to a large language model (LLM) communicatively coupled to the object recognition system, wherein the object recognition subsystem comprises at least one processor and at least one non-transitory processor-readable storage medium communicatively coupled to the at least one processor, the at least one non-transitory processor-readable storage medium storing processor-executable instructions and/or data that, when executed by the at least one processor, cause the robotic system to perform a method for recognizing objects in the environment, the method which includes assigning a first label to the first object, sending, by the interface, a query to the LLM, the query comprising the first label, receiving, by the interface, a response from the LLM, the response in reply to the query, the response comprising a second label, and assigning the second label to the second object.

In some implementations, the object recognition subsystem comprises a plurality of sensors and a sensor data processor, and the method further comprises scanning the environment, by the plurality of sensors, to generate sensor data, and detecting, by the sensor data processor, the presence of the first object and the second object, wherein the detecting, by the sensor data processor, the presence of the first object and the second object is based at least in part on the sensor data. The assigning, by the object recognition subsystem, a first label to the first object may include identifying the first object based at least in part on the sensor data, and assigning a natural language label to the first object. The sending, by the interface, a query to the LLM may include formulating a natural language statement, the natural language statement comprising the natural language label assigned to the first object. The method may further comprise determining a degree of confidence in the identifying of the first object exceeds a determined confidence threshold, wherein the determining a degree of confidence in the identifying of the first object exceeds a determined confidence threshold includes determining a probability.

In some implementations, the scanning the environment, by the plurality of sensors, to generate sensor data includes generating at least one of image data, video data, audio data, or haptic data.

In some implementations, the detecting, by the sensor data processor, the presence of the first object and the second object includes detecting, by the sensor data processor, the presence of the first object and the second object in real time.

In some implementations, the detecting, by the sensor data processor, the presence of the first object and the second object is performed onboard the robot.

In some implementations, the method may further comprise assigning, by the object recognition subsystem, a third label to the second object, wherein the assigning, by the object recognition subsystem, a third label to the second object includes identifying the second object based at least in part on the sensor data, and determining a degree of confidence in the identifying of the second object fails to exceed a determined confidence threshold. The assigning, by the object recognition subsystem, the second label to the second object may include updating the degree of confidence in the identifying of the second object. The updating the degree of confidence in the identifying of the second object may include updating a probability.

In some implementations, the assigning, by the object recognition subsystem, a first label to the first object is performed onboard the robot.

In some implementations, the sending, by the interface, a query to the LLM includes formulating a natural language statement, the natural language statement comprising the first label. The formulating a natural language statement may include structuring the natural language statement to cause the response from the LLM to follow a defined structure.

In some implementations, the receiving, by the interface, a response from the LLM includes receiving a natural language statement, the natural language statement comprising a natural language label, and parsing the natural language statement to extract the natural language label. The assigning, by the object recognition subsystem, a second label to the second object may include assigning the natural language label to the second object.

In some implementations, the assigning, by the object recognition subsystem, a first label to the first object includes identifying the first object, and assigning a natural language label to the first object. The method may further comprise determining a degree of confidence in the identifying of the first object exceeds a determined confidence threshold, wherein the determining a degree of confidence in the identifying of the first object exceeds a determined confidence threshold includes determining a probability. The sending, by the interface, a query to the LLM may include formulating a natural language statement, the natural language statement comprising the natural language label. The formulating a natural language statement may include structuring the natural language statement to cause the response from the LLM to follow a defined structure.

In some implementations, the receiving, by the interface, a response from the LLM includes receiving a natural language statement, the natural language statement comprising a natural language label, and parsing the natural language statement to extract the natural language label.

In some implementations, the method may further comprise assigning, by the object recognition subsystem, a third label to the second object, wherein the assigning, by the object recognition subsystem, a second label to the second object includes comparing the second label with the third label. The assigning, by the object recognition subsystem, a second label to the second object further may include updating a degree of confidence. The updating a degree of confidence may include updating a probability.

In some implementations, the method further comprises determining, by the object recognition system, a location of the first object in the environment.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
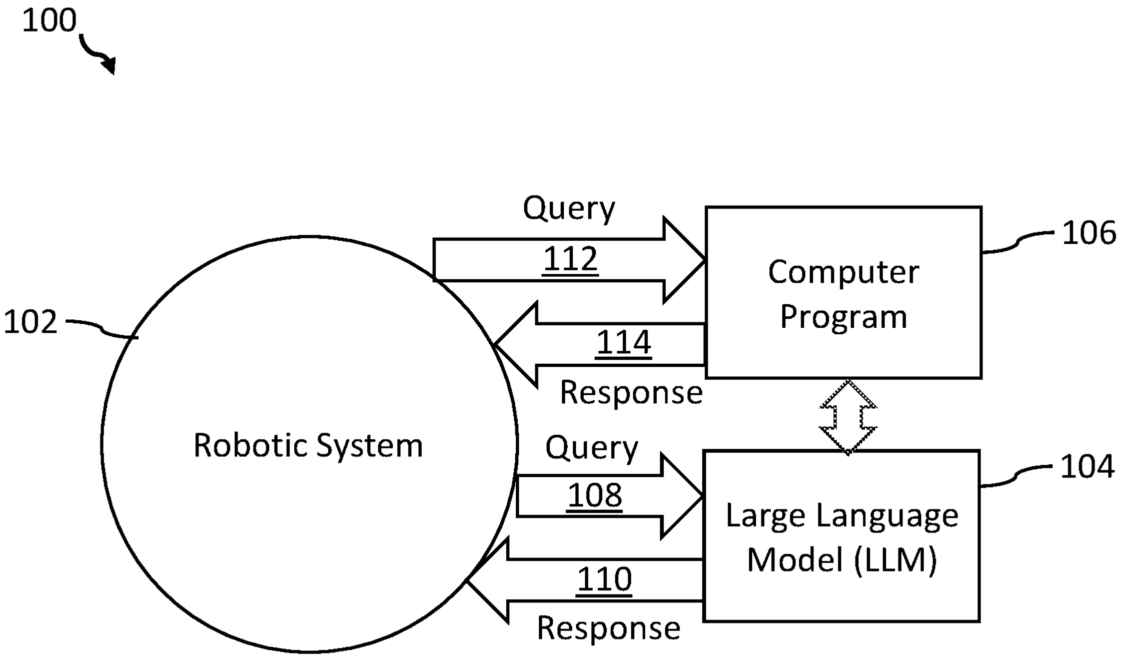
FIG. 1 is a context diagram of an example implementation of a robotic system, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The technology described herein includes the use of Large Language Models (LLMs) with robotic systems. For example, LLMs can be used to enhance the performance of a control subsystem for a robot.

The robotic system may have an interface to one or more LLMs. The interface may include a direct interface to an LLM and/or an indirect interface to an LLM. The interface to the LLM may access the LLM indirectly via a computer program, for example, a software application, a bot, an agent, and/or a tool. An example of a software application that uses an LLM is ChatGPT which is an artificial intelligence chatbot.

Sending a query to an LLM by the interface may include sending a query directly to the LLM and/or sending a query indirectly to the LLM via a computer program, for example, a software application, a bot, an agent, and/or a tool. Similarly, receiving a response from an LLM by the interface may include receiving a response directly from the LLM and/or receiving a response indirectly from the LLM via a computer program, for example, a software application, a bot, an agent, and/or a tool. Thus, throughout this specification and the appended claims, unless the specific context requires otherwise references to an "LLM" include an LLM itself as well as any application or software that runs on or uses the LLM.

In accordance with the present systems, devices, and methods, LLMs can, for example, help a robot recognize objects in the robot's environment autonomously. Recognition of an object in the robot's environment may include, for example, detection of the object, identification of the object, and/or location of the object in the environment. Detection of the object may include detection of the object in sensor data.

A robot may be able to recognize a few objects in its environment with a high degree of certainty. The present technology includes sending a query to an LLM to acquire a list of other objects that may exist in the same environment. The LLM may return a response that includes an ordered list, for example, a list ordered by likelihood of occurrence. The robotic system can use the information from the LLM to help to disambiguate object classes. For example, recognizing a computer keyboard in the environment may increase the chance of another object in the environment being a computer monitor rather than a TV.

A robot may have one or more sensors that it can use to explore and characterize its environment. The sensors may include optical cameras, infrared sensors, LIDA® (light detection and ranging) sensors, and the like. The sensors may include video and/or audio sensors.

In some implementations, the sensors include haptic sensors. Haptic technology can provide a tactile response. For example, haptic technology can simulate the senses of touch and/or motion. Haptic sensors can be used in robotics, for example, when a robot is interacting directly with physical objects. Haptic sensors can help the robot establish haptic profiles of objects in the robot's environment. The haptic profiles can be used to help recognize objects in the robot's environment.

The sensors may also include an inertial navigation system and/or a Global Positioning System. The robot may have access to high-definition maps of the robot's environment.

A robot may use Simultaneous Localization and Mapping (SLAM) technology to build a representation of the robot's environment including, for example, an understanding of the objects in the environment. In some implementations, SLAM uses multi-sensor data fusion-based techniques. Sensors may include at least some of the sensors listed above.

An object recognition subsystem in a robotic system can recognize objects in the environment of the robot. Recognition can include i) detecting the presence of an object in the environment, and ii) identifying the object. Detecting and identifying the object may include analysis of sensor data.

LLMs typically operate on natural language (NL) inputs, and produce NL outputs. Natural language is a language that has developed naturally in use (e.g., English), in contrast to an artificial language or computer code, for example.

The present technology includes sending a natural language statement to an LLM, for example, as a query, and receiving a natural language response from the LLM. The robotic system may include an interface to the LLM which can i) generate a natural language statement that includes a natural language label provided by an object recognition subsystem, and ii) parse a natural language response from the LLM to provide a natural language label to the object recognition subsystem.

Submitting a query to the LLM can include formulating a natural language statement, for example, "I see a computer keyboard. What are some other objects I might see nearby?" Receiving a response from the LLM in reply to the query may include parsing a natural language statement, for example, "You might see a computer mouse, a desk, a lamp, a computer monitor, and a chair."

The natural language statement that is sent as a query to the LLM can be structured so as to dictate the form of an output received from the LLM, for example, "I see a computer keyboard. List the 5 most probable other objects I might see in the same scene, in decreasing order of probability starting with the most probable object. Delimit the objects in the list using semicolons."

In some implementations, the robot uses the output of the LLM to help identify other objects in the robot's environment and/or to disambiguate between object classes.

In some implementations, the robot scans its environment and attempts to identify one or more objects in the environment. The objects may be ranked according to an estimate of the degree of confidence that the object has been correctly identified. The degree of confidence may include an estimate of probability. If the degree of confidence exceeds a determined threshold, then the object recognition subsystem can send a query to the LLM, where the query includes natural language labels for one or more of the objects exceeding the threshold. The query can request the LLM suggests other objects that are likely to be in the same environment. The response from the LLM may include a list of natural language labels for objects likely to be in the same environment. The object recognition subsystem can compare the list of labels from the LLM to a list of objects for which the degree of confidence did not exceed the threshold. Where there is a match between object labels, the object recognition subsystem may increase the degree of confidence for the object. If the degree of confidence is sufficiently high, the object recognition subsystem may assign the label to the object.

In a particular illustrative example, the object recognition subsystem identifies a first object as a computer keyboard with a 98% probability. The object recognition subsystem identifies a second object as i) a TV with a 50% probability, and ii) a computer monitor with 50% probability. The robotic system queries the LLM with the information that the object recognition subsystem has identified the presence of a computer keyboard, and receives a response with "computer monitor" in the list of most likely other objects. "TV" is not in the list of most likely other objects. Based at least in part on the response from the LLM, the object recognition subsystem increases the probability that the object is a computer monitor, and decreases the probability that the object is a TV. With the probability that the object is a computer monitor now being the most likely, the object recognition subsystem may assign the "computer monitor" label to the object.

Some or all of the object recognition subsystem may be on-board the robot.

FIG. 1 is a context diagram 100 of an example implementation of a robotic system 102, in accordance with the present systems, devices, and methods. Context diagram 100 includes robotic system 102 and large language model (LLM) 104. As described above, LLM 104 may be accessed directly and/or indirectly via a computer program 106. For example, computer program 106 may be a software application, a bot, an agent, and/or a tool.

Robotic system 102 is described below with reference to FIGS. 2 and 3.

LLM 104 is external to robotic system 102. Robotic system 102 is communicably coupled to LLM 104. In operation, robotic system 102 can send a query 108 to LLM 104. In operation, LLM 104 can send a response 110 to robotic system 102. Response 110 can be in reply to query 108. Query 108 sent by robotic system 102 to LLM 104 can be sent directly to LLM 104. Response 110 received by robotic system 102 from LLM 104 can be received directly from LLM 104.

Computer program 106 is external to robotic system 102. Robotic system 102 is communicably coupled to computer program 106. In operation, robotic system 102 can send a query 112 to computer program 106. In operation, computer program 106 can send a response 114 to robotic system 102. Response 114 can be in reply to query 112. Query 112 sent by robotic system 102 to LLM 104 can be sent indirectly to LLM 104 via computer program 106. Response 114 received by robotic system 102 from LLM 104 can be received indirectly from LLM 104 via computer program 106.

Figure 2:
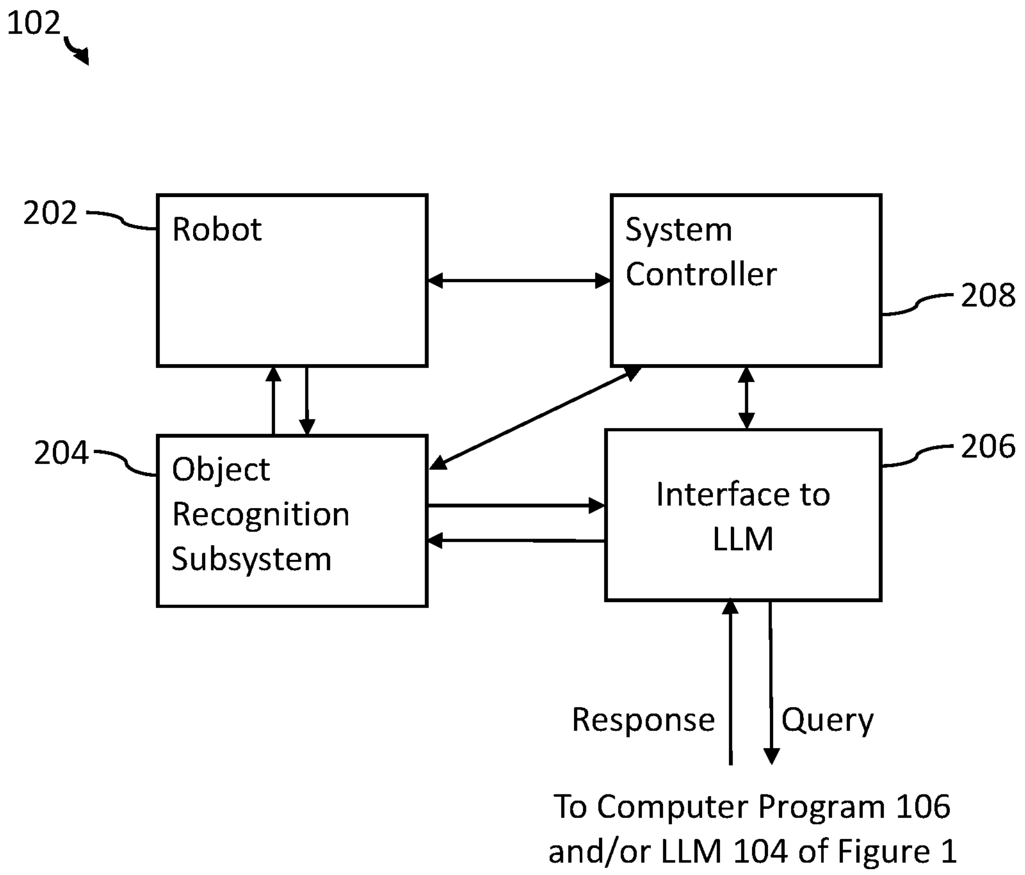
FIG. 2 is a high-level block diagram of an example implementation of the robotic system of FIG. 1, in accordance with the present systems, devices, and methods.

FIG. 2 is a high-level block diagram of an example implementation of robotic system 102 of FIG. 1, in accordance with the present systems, devices, and methods.

Robotic system 102 includes a robot 202, an object recognition subsystem 204, an interface 206 to an LLM (for example, LLM 104 of FIG. 1), and a system controller 208.

Object recognition subsystem 204 is described in more detail with reference to FIG. 3. Object recognition subsystem 204 is communicatively coupled to robot 202 and interface 206. System controller 208 is communicatively coupled to robot 202, object recognition subsystem 204, and interface 206.

Figure 3:
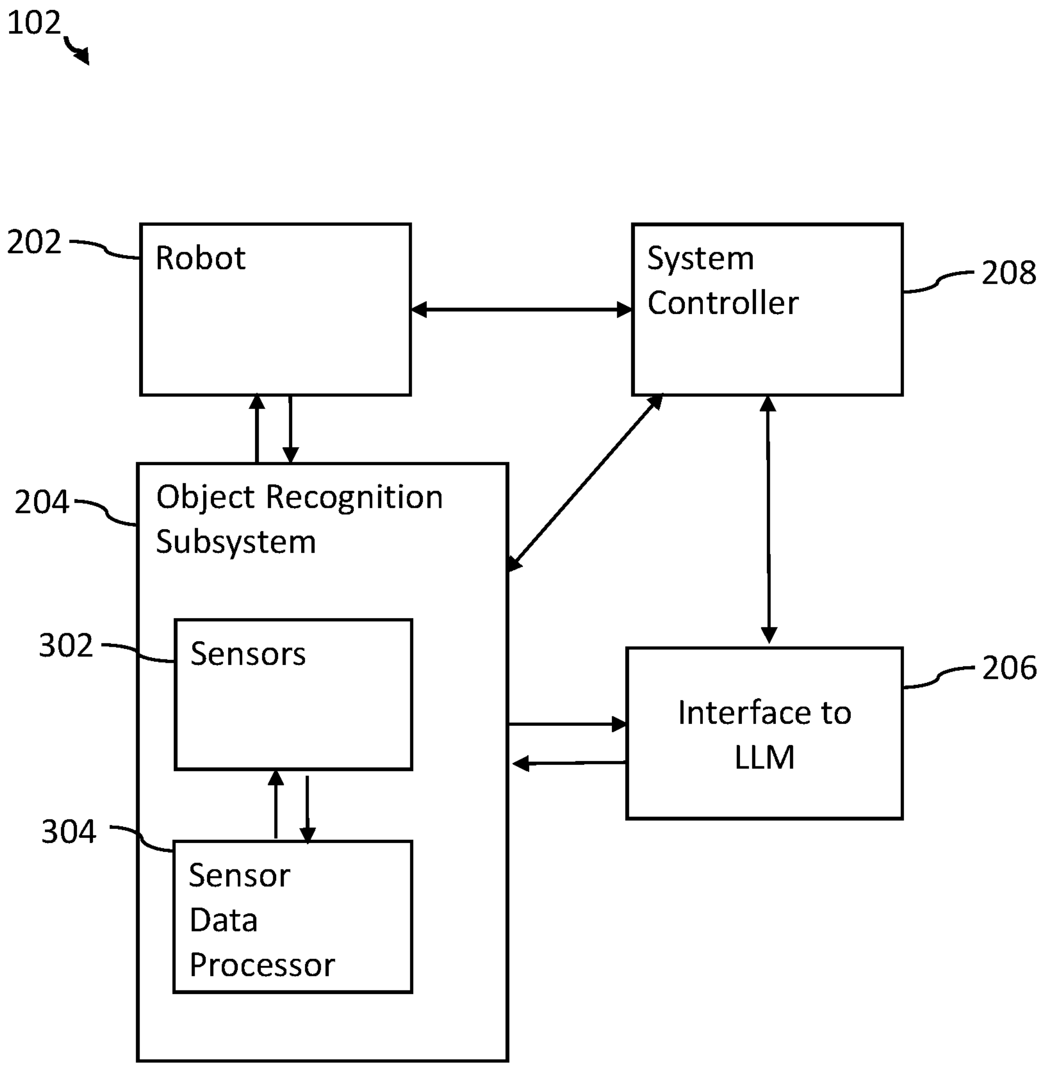
FIG. 3 is a more detailed block diagram of the robotic system of FIG. 2, in accordance with the present systems, devices, and methods.

FIG. 3 is a more detailed block diagram of robotic system 102 of FIG. 2, in accordance with the present systems, devices, and methods. Object recognition subsystem 202 comprises sensors 302 and a sensor data processor 304. Sensor data processor 304 is communicatively coupled to sensors 302.

Figure 4:
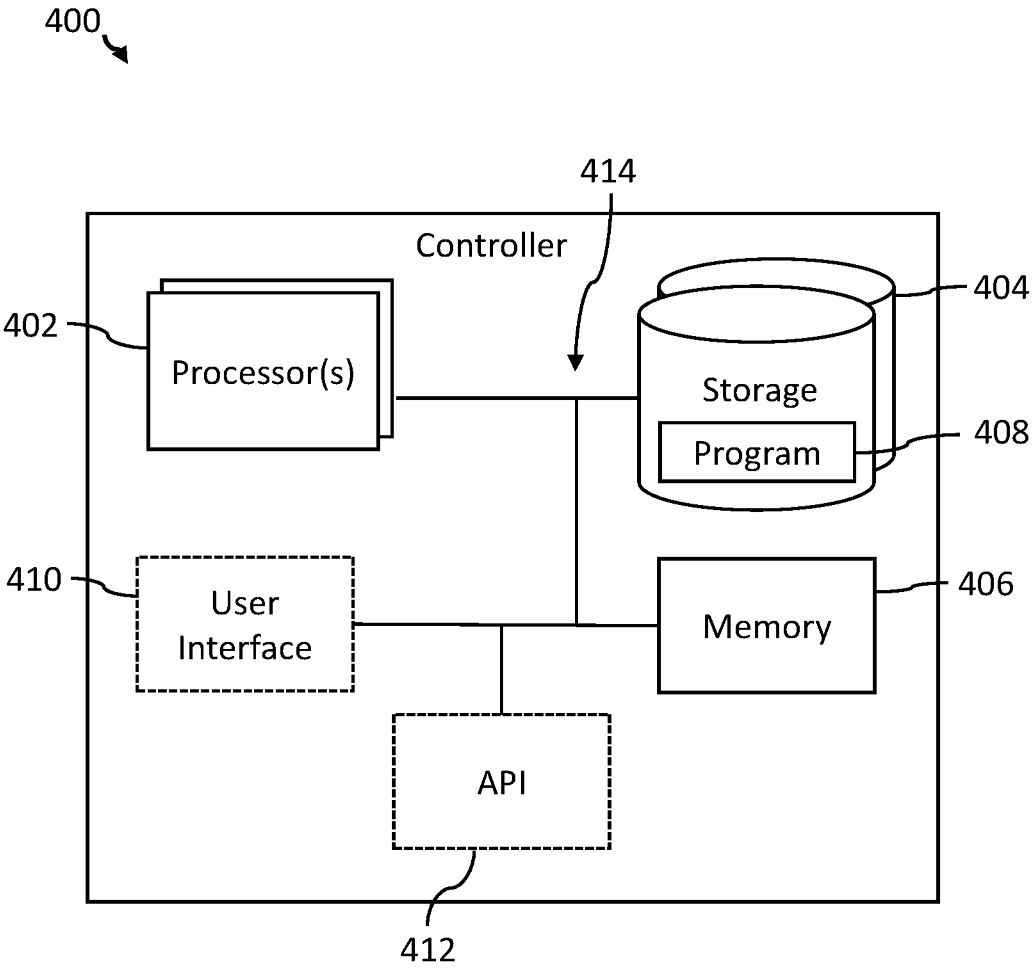
FIG. 4 is a block diagram of an example implementation of a controller of the robotic system of FIG. 2, in accordance with the present systems, devices, and methods.

FIG. 4 is a block diagram of an example implementation of a controller 400 of the robotic system of FIG. 2, in accordance with the present systems, devices, and methods. Controller 400 may be a system controller (e.g., system controller 208 of FIG. 2). Controller 400 may be a controller internal to robot 202, object recognition subsystem 204, and/or interface 206. In various implementations, control functionality may be centralized or distributed.

Controller 400 includes one or more processors 402, one or more non-volatile storage media 404, and memory 406. The one or more non-volatile storage media 404 include a computer program product 408.

Controller 400 optionally includes a user interface 410 and/or an application programming interface (API) 412.

The one or more processors 402, non-volatile storage media 404, memory 406, user interface 410, and API 412 are communicatively coupled via a bus 414.

Controller 400 may control and/or perform some or all of the acts of FIGS. 6, 7, 8, 9A, and 9B.

Figure 5:
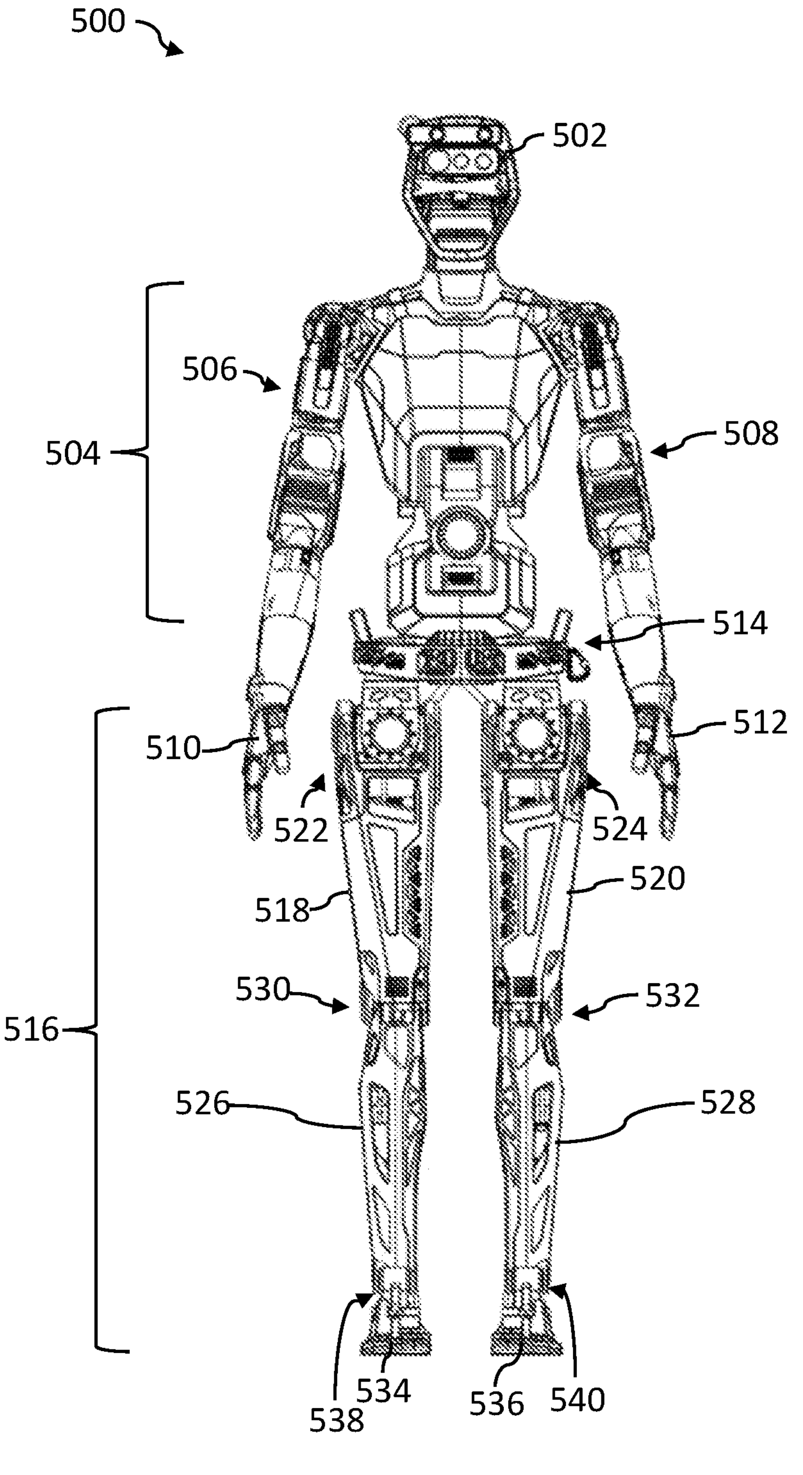
FIG. 5 is a schematic drawing of a front view of a robot, in accordance with the present systems, devices, and methods.

FIG. 5 is a schematic drawing of a front view of a robot 500 (for example, robot 202 of FIG. 2), in accordance with the present systems, devices, and methods.

In some implementations, robot 500 is capable of autonomous travel (e.g., via bipedal walking).

Robot 500 includes a head 502, a torso 504, robotic arms 506 and 508, and hands 510 and 512. Robot 500 is a bipedal robot, and includes a joint 514 between torso 504 and robotic legs 516. Joint 514 may allow a rotation of torso 504 with respect to robotic legs 516. For example, joint 514 may allow torso 504 to bend forward.

Robotic legs 516 include upper legs 518 and 520 with hip joints 522 and 524, respectively. Robotic legs 516 also include lower legs 526 and 528, mechanically coupled to upper legs 518 and 520 by knee joints 530 and 532, respectively. Lower legs 526 and 528 are also mechanically coupled to feet 534 and 536 by ankle joints 538 and 540, respectively. In various implementations, one or more of hip joints 522 and 524, knee joints 530 and 532, and ankle joints 538 and 540 are actuatable joints.

Robot 500 may be a hydraulically-powered robot. In some implementations, robot 500 has alternative or additional power systems. In some implementations, torso 504 houses a hydraulic control system, for example. In some implementations, components of the hydraulic control system may alternatively be located outside the robot, e.g., on a wheeled unit that rolls with the robot as it moves around (see, for example, FIG. 2 and accompanying description below), or in a fixed station to which the robot is tethered. The hydraulic control system of robot 500 may include a hydraulic pump, a reservoir, and/or an accumulator. Hydraulic hoses may provide hydraulic couplings between the hydraulic control system and one or more pressure valves.

In some implementations, robot 500 may be part of a mobile robot system that includes a mobile base.

Figure 6:
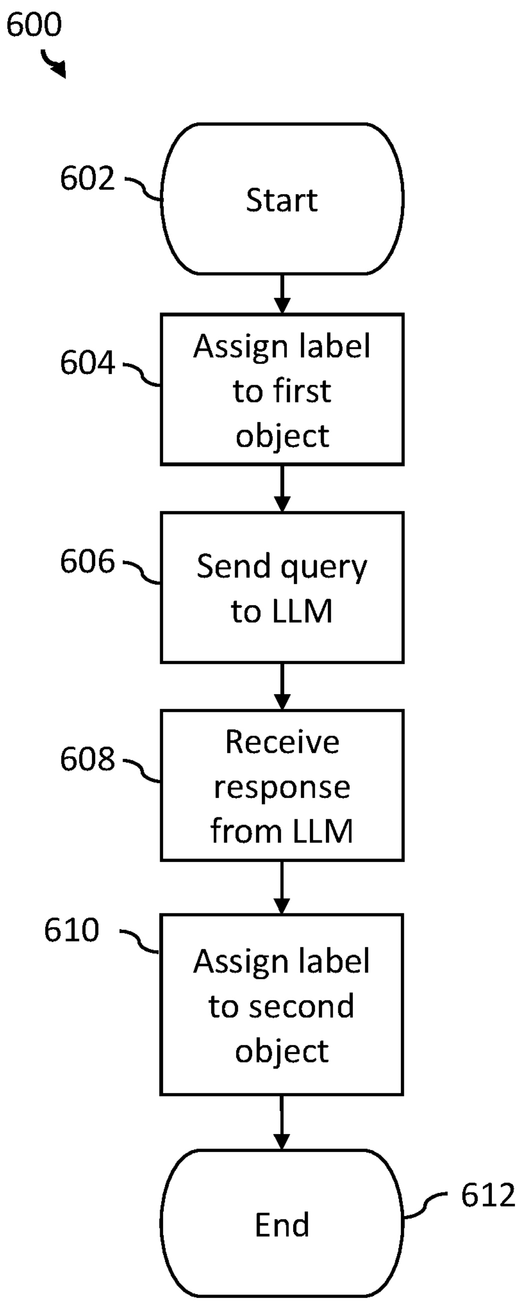
FIG. 6 is a flow chart of an example implementation of a method of operation of a robotic system, in accordance with the present systems, devices, and methods.

FIG. 6 is a flow chart of an example implementation of a method 600 of operation of a robotic system, in accordance with the present systems, devices, and methods. Method 600 of FIG. 6 includes six (6) acts 602, 604, 606, 608, 610, and 612. Those of skill in the art will appreciate that in alternative implementations certain acts of FIG. 6 may be omitted and/or additional acts may be added. Those of skill in the art will also appreciate that the illustrated order of the acts is shown for exemplary purposes only and may change in alternative implementations.

At 602, in response to a starting condition, for example, identification of an object in an environment of a robot (for example, robot 202 of FIG. 2), method 600 starts. At 604, an object recognition system assigns a natural language label to a first object. The presence of the first object may have been detected by sensors and a sensor data processor of the object recognition subsystem.

At 606, an interface to an LLM sends a query to the LLM. The query may include a natural language statement. The query may include a natural language label assigned to the first object.

At 608, the interface to the LLM receives a response from the LLM, in reply to the query sent to the LLM at 606. The response may include a natural language statement. The response may include a natural language label for a second object. The response may include a list of objects. The list of objects may be ordered. The list of objects may be in order of likelihood of being present in the environment.

At 610, the object recognition subsystem assigns a label to the second object. The label may be a natural language label.

At 612, method 600 ends.

Figure 7:
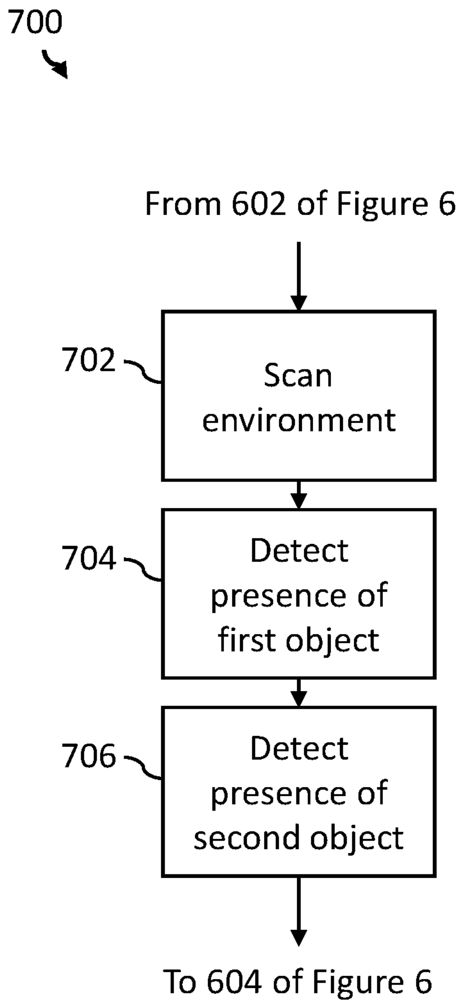
FIG. 7 is a flow chart of an example implementation of additional acts for the method of operation of FIG. 6, in accordance with the present systems, devices, and methods.

FIG. 7 is a flow chart of an example implementation of additional acts 700 for method 600 of FIG. 6 of operation of a robotic system, in accordance with the present systems, devices, and methods. Method 700 of FIG. 7 includes three (3) acts 702, 704, and 706. Those of skill in the art will appreciate that in alternative implementations certain acts of FIG. 7 may be omitted and/or additional acts may be added. Those of skill in the art will also appreciate that the illustrated order of the acts is shown for exemplary purposes only and may change in alternative implementations.

At 702, in response to the starting condition of 602 of FIG. 6, the robotic system scans the environment of the robot. Scanning may include recording data from a plurality of sensors.

At 704, the object recognition subsystem detects the presence of a first object.

At 706, the object recognition subsystem detects the presence of a second object, and returns control to 604 of FIG. 6.

Detecting the presence of the first object and the second object may be based at least in part on sensor data, and may be the result of data analysis by the sensor data processor. Detecting the presence of the first object and the second object may be performed in real-time.

Figure 8:
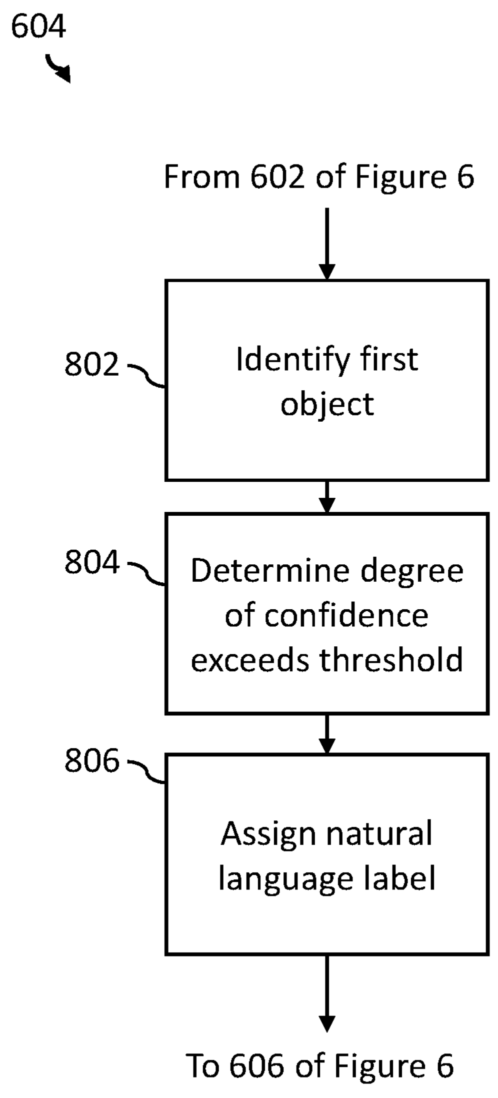
FIG. 8 is a flow chart of an example implementation of the act of FIG. 6 for assigning a label to a first object, in accordance with the present systems, devices, and methods.

FIG. 8 is a flow chart of an example implementation of a method 604 of FIG. 6 for assigning a label to a first object, in accordance with the present systems, devices, and methods. Method 800 of FIG. 8 includes three (3) acts 802, 804, and 806. Those of skill in the art will appreciate that in alternative implementations certain acts of FIG. 8 may be omitted and/or additional acts may be added. Those of skill in the art will also appreciate that the illustrated order of the acts is shown for exemplary purposes only and may change in alternative implementations.

At 802, in response to the starting condition of 602 of FIG. 6, the object recognition subsystem identifies the first object. Identifying the first object may be based at least in part on sensor data.

At 804, the object recognition subsystem determines a degree of confidence in the identification of the first object. The degree of confidence may be an estimate. The estimate may be based at least in part on the sensor data. The degree of confidence may include a probability and/or score.

At 806, the object recognition subsystem assigns a natural language label to the first object, and returns control to 606 of FIG. 6.

Figure 9A:
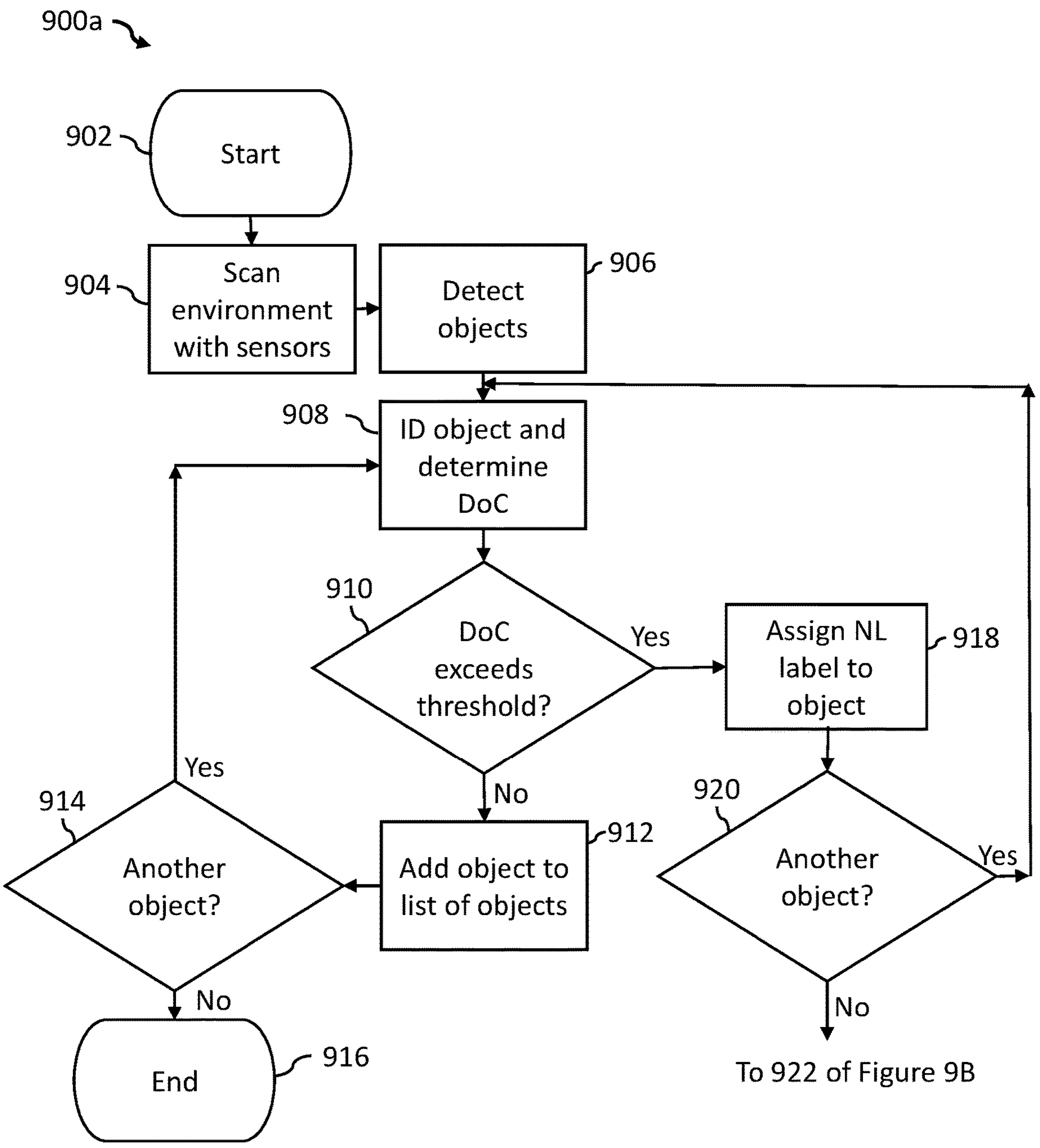
FIGS. 9A and 9B are flow charts of a first and a second part, respectively, of an example implementation of a method of operation of a robotic system, in accordance with the present systems, devices, and methods.
Figure 9B:
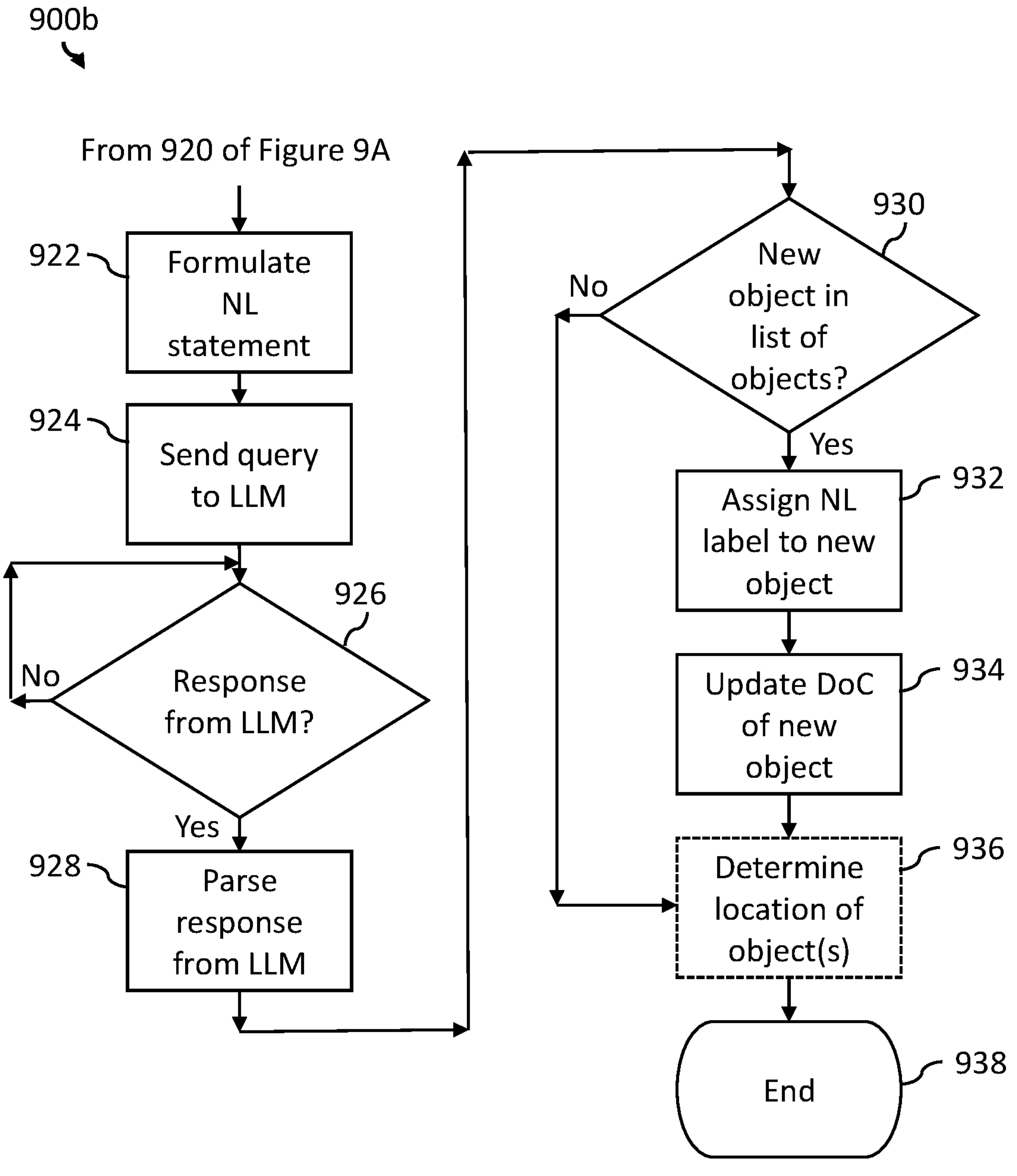

FIGS. 9A and 9B are flow charts of a first and a second part, 900*a* and 900*b*, respectively, of an example implementation of a method of operation of a robotic system, in accordance with the present systems, devices, and methods.

Method 900*a* of FIG. 9A includes ten (10) acts 902, 904, 906, 908, 910, 912, 914, 916, 918, and 920. Those of skill in the art will appreciate that in alternative implementations certain acts of FIG. 9A may be omitted and/or additional acts may be added. Those of skill in the art will also appreciate that the illustrated order of the acts is shown for exemplary purposes only and may change in alternative implementations.

At 902, in response to a starting condition (e.g., a command to the robotic system, or a command from a robot or a system controller), method 900*a* starts.

At 904, the object recognition subsystem scans the environment of the robot using a plurality of sensors. The sensors are described above with reference to FIG. 3.

At 906, the object recognition subsystem detects the presence of one or more objects. Detecting the presence of objects is based at least in part on sensor data.

At 908, the object recognition subsystem identifies an object and determines a degree of confidence.

If, at 910, the degree of confidence fails to exceed a determined threshold, then method 900*a* proceeds to 912 where the object recognition subsystem adds the object to a list of objects. If, at 914, the object recognition subsystem determines there is another object, then method 900*a* returns to 908. Otherwise, method 900*a* ends at 916.

If, at 910, the degree of confidence exceeds a determined threshold, then method 900*a* proceeds to 918, where the object recognition subsystem assigns a natural language label to the object.

The implementation of FIG. 9A is an example implementation. In other example implementations, the object recognition subsystem may identify an object and send a query to the LLM without determining a degree of confidence.

If, at 920, the object recognition subsystem determines there is another object, then method 900*a* returns to 908. Otherwise, method 900*a* proceeds to 922 of FIG. 9B.

In some implementations, a robotic system assigns a natural language label to more than one object before sending a query to an LLM. The query may contain one or more of the assigned natural language labels. For example, the query may include "I see a table, a chair, and a computer. What other objects might I see nearby?"

Method 900*b* of FIG. 9B includes nine (9) acts 922, 924, 926, 928, 930, 932, 934, 936, and 938. Those of skill in the art will appreciate that in alternative implementations certain acts of FIG. 9 may be omitted and/or additional acts may be added. Those of skill in the art will also appreciate that the illustrated order of the acts is shown for exemplary purposes only and may change in alternative implementations.

At 922, an interface to an LLM formulates a natural language statement. The natural language statement may include natural language labels assigned to one or more objects. At 924, the interface to the LLM sends a query to the LLM. The query may include the natural language statement.

The interface to the LLM waits at 926 until the interface to the LLM receives a response from the LLM. The response from the LLM may be in reply to the query. At 928, the interface to the LLM parses the response from the LLM. Parsing the response may include extracting one or more natural language labels for new objects.

If, at 930, the object recognition subsystem determines a new object is an object in the list of objects (see act 912 of FIG. 9A), then method 900*b* proceeds to 932 where the object recognition subsystem assigns a natural language label to the object in the list of objects. At 934, the object recognition subsystem updates the degree of confidence for the object.

The implementation of FIG. 9B is an example implementation. In other example implementations, the object recognition subsystem assigns the natural language label to the object in the list of objects without updating, or indeed without using, the degree of confidence for the object.

In some implementations, the object recognition subsystem identifies a first set of candidate objects in the environment, and sends a query to the LLM. The LLM responds with a second set of candidate objects in the environment. The object recognition subsystem compares the first and the second set of candidate objects, and extracts one or more matching pairs of objects from the first and the second set of candidate objects. The object recognition subsystem assigns a natural language label to one or more of the matching pairs.

At 936, the object recognition subsystem optionally determines the locations of one or more objects detected and/or identified by the object recognition subsystem.

At 938, method 900*b* ends.

Some or all of the acts of FIGS. 6, 7, 8, 9A, and 9B may be performed in real-time. Some or all of the acts of FIGS. 6, 7, 8, 9A, and 9B may be performed on-board the robot.

Figure 10:
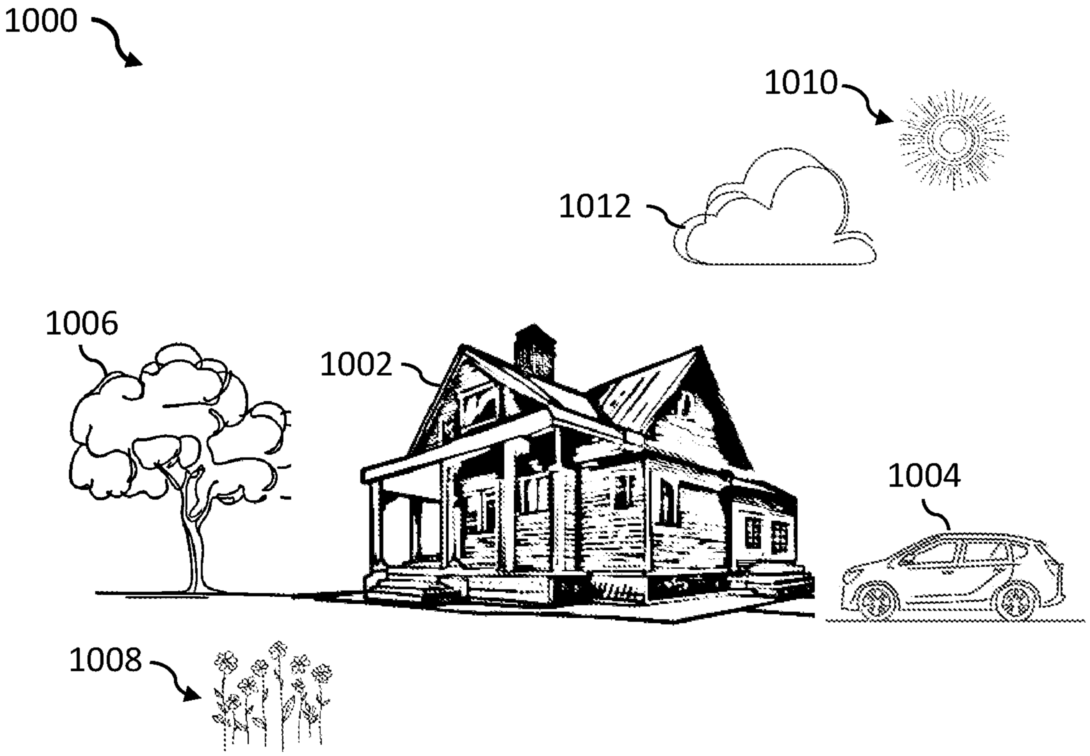
FIG. 10 is a schematic drawing of an example environment of a robot (for example, the robot of FIG. 2), in accordance with the present systems, devices, and methods.

FIG. 10 is a schematic drawing of an example environment 1000 of a robot (for example, robot 202 of FIG. 2), in accordance with the present systems, devices, and methods. Environment 1000 includes a house 1002.

In an example implementation of a robotic system (for example, robotic system 102 of FIG. 1), an object recognition subsystem (for example, object recognition subsystem 204 of FIG. 2) identifies house 1002 in environment 1000 of a robot (for example, robot 202 of FIG. 2). The object recognition subsystem queries an LLM and receives a response indicating the likely presence of other objects in the same environment. In the example illustrated in FIG. 10, the other objects may include a car 1004, a tree 1006, a garden 1008, a sun 1010, and clouds 1012.

Figure 11:
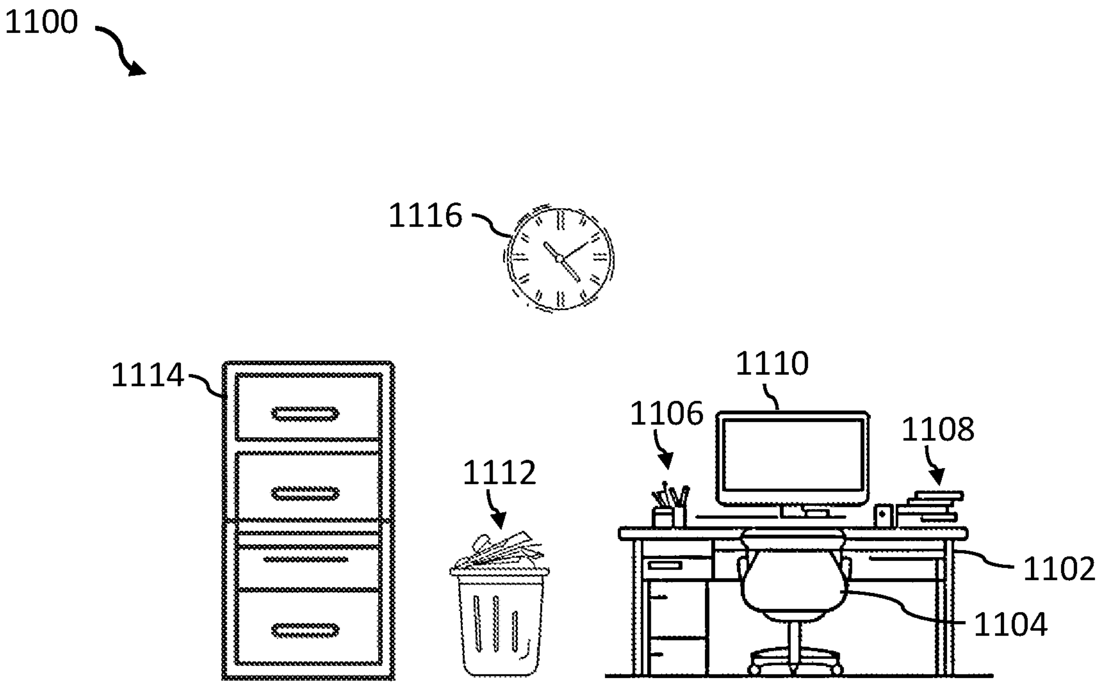
FIG. 11 is a schematic drawing of another example environment of a robot (for example, the robot of FIG. 2), in accordance with the present systems, devices, and methods.

FIG. 11 is a schematic drawing of another example environment 1100 of a robot (for example, robot 202 of FIG. 2), in accordance with the present systems, devices, and methods. Environment 1100 includes a desk 1102.

In an example implementation of a robotic system (for example, robotic system 102 of FIG. 1), an object recognition subsystem (for example, object recognition subsystem 204 of FIG. 2) identifies desk 1102 in environment 1100 of a robot (for example, robot 202 of FIG. 2). The object recognition subsystem queries an LLM and receives a response indicating the likely presence of other objects in the same environment. In the example illustrated in FIG. 11, the other objects may include a chair 1104, pens 1106, documents 1108, a computer monitor 1110, a wastepaper basket 1112, a filing cabinet 1114, and a wall clock 1116.

The robot systems described herein may, in some implementations, employ any of the teachings of U.S. Provisional Patent Application Ser. No. 63/441,897, filed Jan. 1, 2023;

U.S. patent application Ser. No. 18/375,943, U.S. patent application Ser. No. 18/513,440, U.S. patent application Ser. No. 18/417,081, U.S. patent application Ser. No. 18/424,551, U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), US Patent Publication No. US 2021-0307170 A1, and/or U.S. patent application Ser. No. 17/386,877, as well as U.S. Provisional Patent Application Ser. No. 63/151,044, U.S. patent application Ser. No. 17/719,110, U.S. patent application Ser. No. 17/737,072, U.S. patent application Ser. No. 17/846,243, U.S. patent application Ser. No. 17/566,589, U.S. patent application Ser. No. 17/962,365, U.S. patent application Ser. No. 18/089,155, U.S. patent application Ser. No. 18/089,517, U.S. patent application Ser. No. 17/985,215, U.S. patent application Ser. No. 17/883,737, U.S. Provisional Patent Application Ser. No. 63/441,897, and/or U.S. patent application Ser. No. 18/117,205, each of which is incorporated herein by reference in its entirety.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of autonomously recognizing objects in an environment, the method performed by a robotic system comprising a robot, an object recognition subsystem, and an interface to a large language model (LLM), and the environment comprising a first object and at least a second object, the method comprising:
- identifying, by the object recognition subsystem, the first object;
- determining, by the object recognition subsystem, that a degree of confidence in identifying the first object exceeds a threshold;
- assigning, by the object recognition subsystem, a first label to the first object;
- identifying, by the object recognition subsystem, the second object;
- determining, by the object recognition subsystem, that a degree of confidence in identifying the second object fails to exceed the threshold;
- sending, by the interface, a query to the LLM, the query comprising the first label and a request to provide a list of labels for the second object, the list of labels ranked according to an estimate of the degree of confidence that each label matches the second object;
- receiving, by the interface, a response from the LLM, the response in reply to the query, the response comprising the list of labels for the second object;
- matching, by the object recognition subsystem, the second object to a second label in the list of labels in the response from the LLM; and
- assigning, by the object recognition subsystem, the second label to the second object.

2. The method of claim 1, the object recognition subsystem comprising a plurality of sensors and a sensor data processor, the method further comprising:
- scanning the environment, by the plurality of sensors, to generate sensor data; and
- detecting, by the sensor data processor, the presence of the first object and the second object, wherein the detecting, by the sensor data processor, the presence of the first object and the second object is based at least in part on the sensor data.

3. The method of claim 2, wherein the assigning, by the object recognition subsystem, a first label to the first object includes:
- identifying the first object based at least in part on the sensor data; and
- assigning a natural language label to the first object.

4. The method of claim 3, wherein the sending, by the interface, a query to the LLM includes formulating a natural language statement, the natural language statement comprising the natural language label assigned to the first object and the request to provide the list of labels for the second object.

5. The method of claim 3, wherein the determining a degree of confidence in the identifying of the first object exceeds a determined confidence threshold includes determining a probability.

6. The method of claim 2, wherein the scanning the environment, by the plurality of sensors, to generate sensor data includes generating at least one of image data, video data, audio data, or haptic data.

7. The method of claim 2, wherein the detecting, by the sensor data processor, the presence of the first object and the second object includes detecting, by the sensor data processor, the presence of the first object and the second object in real time.

8. The method of claim 2, wherein the robot includes haptic sensors, and wherein:
- detecting, by the sensor data processor, the presence of the first object and the second object includes establishing, by the haptic sensors, respective haptic profiles of the first object and the second object;
- identifying, by the object recognition system, the first object includes identifying, by the object recognition system, the first object based at least in part on the haptic profile of the first object; and
- identifying, by the object recognition system, the second object includes identifying, by the object recognition system, the second object based at least in part on the haptic profile of the second object.

9. The method of claim 1, wherein the assigning, by the object recognition subsystem, the second label to the second object includes updating the degree of confidence in the identifying of the second object.

10. The method of claim 1, wherein the sending, by the interface, a query to the LLM includes formulating a natural language statement, the natural language statement comprising the first label and the request to provide the list of labels for the second object.

11. The method of claim 10, wherein the formulating a natural language statement includes structuring the natural language statement to cause the response from the LLM to follow a defined structure.

12. The method of claim 1, wherein the receiving, by the interface, a response from the LLM includes:

receiving a natural language statement, the natural language statement comprising the list of labels for the second object; and parsing the natural language statement to extract the list of labels for the second object.

13. The method of claim 1 wherein matching, by the object recognition subsystem, the second object to a second label in the list of labels in the response from the LLM includes increasing the degree of confidence in identifying the second object to exceed the threshold.

* * * * *